US011659387B2

(12) United States Patent
Nair et al.

(10) Patent No.: US 11,659,387 B2
(45) Date of Patent: May 23, 2023

(54) USER EQUIPMENT AUTHENTICATION PREVENTING SEQUENCE NUMBER LEAKAGE

(71) Applicant: Nokia Technologies Oy, Espoo (FI)

(72) Inventors: Suresh Nair, Whippany, NJ (US); Ranganathan Mavureddi Dhanasekaran, Nuremberg (DE); Anja Jerichow, Grafing (DE)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 16/943,869

(22) Filed: Jul. 30, 2020

(65) Prior Publication Data
US 2022/0038896 A1    Feb. 3, 2022

(51) Int. Cl.
*H04W 12/72* (2021.01)
*H04W 12/06* (2021.01)
*H04L 9/32* (2006.01)
*H04L 9/40* (2022.01)
*H04W 8/18* (2009.01)

(52) U.S. Cl.
CPC .......... *H04W 12/06* (2013.01); *H04L 9/3271* (2013.01); *H04L 63/08* (2013.01); *H04W 8/18* (2013.01); *H04W 12/72* (2021.01)

(58) Field of Classification Search
CPC .............................. H04W 12/06; H04W 12/71
See application file for complete search history.

(56) References Cited

U.S. PATENT DOCUMENTS

2020/0068397 A1* 2/2020 Kang ................ H04L 63/0435
2020/0204985 A1* 6/2020 An ..................... H04W 12/03

FOREIGN PATENT DOCUMENTS

WO         2019088599 A1    5/2019
WO    PCT/IB2021/056765    10/2021

OTHER PUBLICATIONS

3GPP, "3rd Generation Partnership Project; Technical Specification Group Services and System Aspects; Study on Authentication Enhancements in 5G System; (Release 16)," 3GPP TR 33.846 V0.6.0, May 2020, 25 pages.
3GPP, "3rd Generation Partnership Project; Technical Specification Group Services and System Aspects; Security Architecture and Procedures for 5G Aystem (Release 15)," 3GPP TS 33,501 V15.9.0, Jul. 2020, 192 pages.

(Continued)

*Primary Examiner* — Michael T Vu
(74) *Attorney, Agent, or Firm* — Ryan, Mason & Lewis, LLP

(57) ABSTRACT

Techniques for preventing sequence number leakage during user equipment authentication in a communication network are provided. For example, a method comprises obtaining a permanent identifier and an authentication sequence value that are unique to user equipment, concealing the permanent identifier and the authentication sequence value, and sending the concealed permanent identifier and the authentication sequence value in a registration message from the user equipment to a communication network. Then, advantageously, in response to receipt of an authentication failure message from the communication network, the user equipment can send a response message to the communication network containing a failure cause indication without a re-synchronization token.

28 Claims, 9 Drawing Sheets

(56) References Cited

OTHER PUBLICATIONS

3GPP, "3rd Generation Partnership Project; Technical Specification Group Services and System Aspects; System Architecture for the 5G System (5GS); Stage 2 (Release 16)," 3GPP TS 23.501 V16.5.0, Jul. 2020, 441 pages.

3GPP, "3rd Generation Partnership Project; Technical Specification Group Core Network and Terminals; 5G System Authentication Server Services; Stage 3 (Release 16)," 3GPP TS 29.509 V16.4.0, Jul. 2020, 60 pages.

3GPP, "3rd Generation Partnership Project; Technical Specification Group Core Network and Terminals; 5G System Network Function Repository Services; Stage 3 (Release 16)," 3GPP TS 29.510 V16.4.0, Jul. 2020, 192 pages.

R. Borgaonkar et al., "New Privacy Threat on 3G, 4G, and Upcoming 5G AKA Protocols," Proceedings on Privacy Enhancing Technologies, Feb. 2019, pp. 108-127, vol. 2019, No. 3.

R. Borgaonkar et al., "New Privacy Threat on 3G, 4G, and Upcoming 5G AKA Protocols," Sciendo, Proceedings on Privacy Enhancing Technologies, Dec. 3, 2018, pp. 1-20.

3GPP, "3rd Generation Partnership Project; Technical Specification Group Services and System Aspects; Study on authentication enhancements in 5G System; (Release 16)," 3GPP TR 33.846 V0.6.0, May 25, 2020, 25 pages.

3GPP, "SQNms Protection by Concealment," TSG-SA3 Meeting #100e, S3-201613, e-meeting, Aug. 17-28, 2020, 7 pages.

3GPP, "Universal Mobile Telecommunications System (UMTS); LTE; Characteristics of the Universal Subscriber Identity Module (USIM) Application (3GPP TS 31.102 version 15.1.0 Release 15)," ETSI TS 131 102 V15.1.0, Jul. 2018, 309 pages.

3GPP, "3rd Generation Partnership Project; Technical Specification Group Services and System Aspects; 3G Security Security Architecture (Release 16)," 3GPP TS 33.102 V16.0.0, Jul. 2020, 77 pages.

3GPP, "Universal Mobile Telecommunications System (UMTS); 3G Security; Security Architecture (3GPP TS 33.102 version 4.2.0 Release 4)," ETSI TS 133 102 V4.2.0, Sep. 2001, 64 pages.

\* cited by examiner

USER EQUIPMENT AUTHENTICATION PREVENTING SEQUENCE NUMBER LEAKAGE

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," the disclosure of which is incorporated by reference herein in its entirety. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with user equipment authentication can present a significant challenge.

SUMMARY

Illustrative embodiments provide techniques for preventing sequence number leakage during user equipment authentication in a communication network.

For example, in one illustrative embodiment, a method comprises obtaining a permanent identifier and an authentication sequence value that are unique to user equipment, concealing the permanent identifier and the authentication sequence value, and sending the concealed permanent identifier and the authentication sequence value in a registration message from the user equipment to a communication network. Then, advantageously, in response to receipt of an authentication failure message from the communication network, the user equipment can send a response message to the communication network containing a failure cause indication without a re-synchronization token.

In another illustrative embodiment, a method comprises receiving, at a network entity of a communication network, a registration message that comprises a concealed combination of a permanent identifier and an authentication sequence value that are unique to user equipment, causing de-concealment of the permanent identifier and the authentication sequence value, storing the received authentication sequence value for use in a later step of authentication failure, and determining an authentication method based on the permanent identifier. Then, advantageously, in response to receipt of an authentication request for the user equipment following an authentication failure of the user equipment, the network entity can utilize the stored authentication sequence value received in the registration message to generate a new authentication vector for use in authenticating the user equipment.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. For example, 5G TS 29.509, entitled "Technical Specification Group Core Network and Terminals; 5G System; Authentication Server Services" and 5G TS 29.510, entitled "Technical Specification Group Core Network and Terminals; 5G System; Network Function Repository Services," the disclosures of which are incorporated by reference herein in their entireties, may be mentioned below in the context of some illustrative embodiments. Still further, 3GPP TS 33.102, entitled "Technical Specification Group Services and System Aspects; 3G Security; Security Architecture" and 3GPP TR 33.846, entitled "Technical Specification Group Services and System Aspects; Study on Authentication Enhancements in 5G System," the disclosures of which are incorporated by reference herein in their entireties, may also be mentioned below in the context of some illustrative embodiments.

However, while well-suited for 5G-related 3GPP standards, embodiments are not necessarily intended to be limited to any particular standards.

Illustrative embodiments are related to user equipment authentication in 5G networks. Prior to describing such illustrative embodiments, a general description of main components of a 5G network will be described below in the context of FIGS. 1 and 2.

Figure 1:
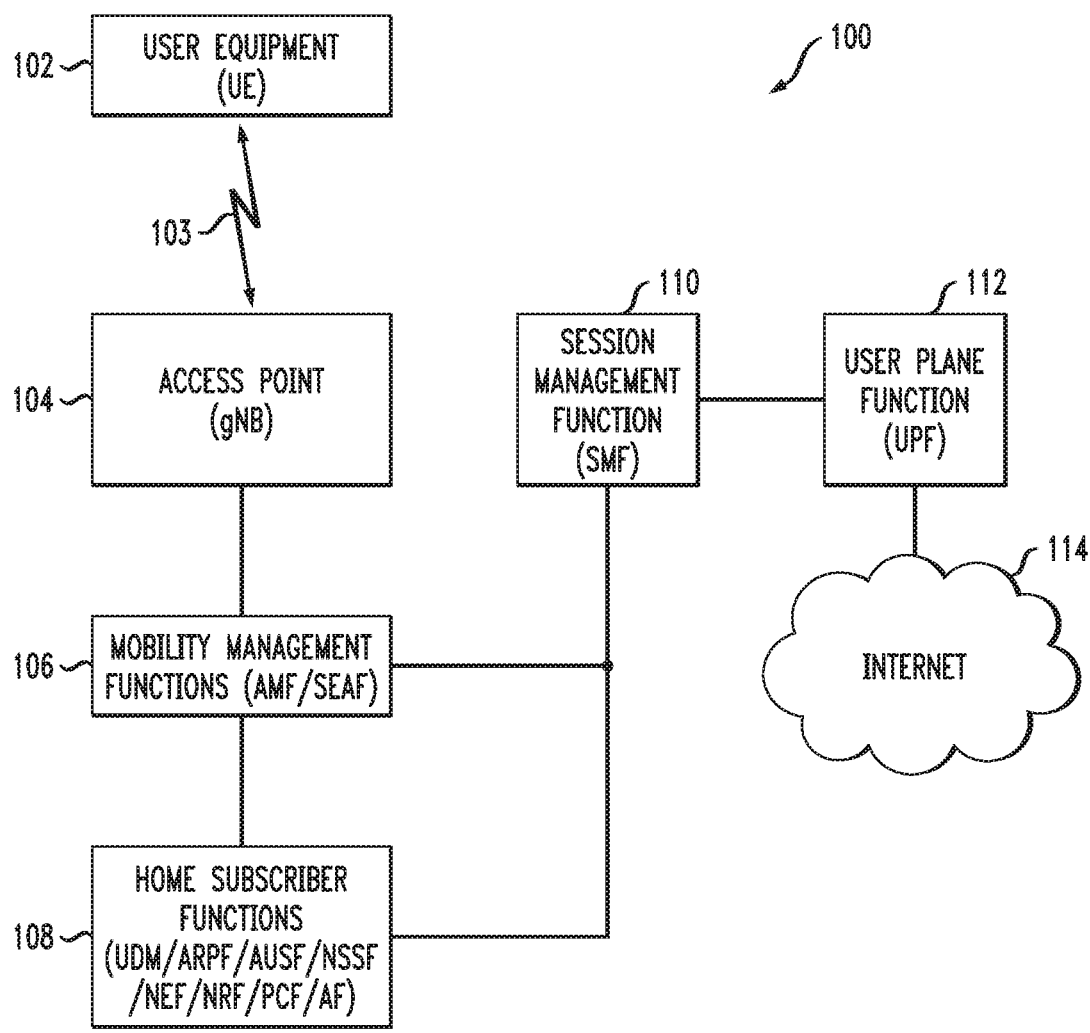
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 2-digit or 3-digit Mobile Network Code (MNC), and a 9-digit or 10-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity or authentication entities. Further, an Authentication Credential Repository and Processing Function (ARPF) can be utilized in conjunction with the UDM. In addition, home subscriber functions may also include, but are not limited to, Network Slice Selection Function (NSSF), Network Exposure Function (NEF), Network Repository Function (NRF), Policy Control Function (PCF), and Application Function (AF).

Note that a UE, such as UE 102, is typically subscribed to what is referred to as a Home Public Land Mobile Network (HPLMN) in which some or all of the home subscriber functions 108 reside. If the UE is roaming (not in the HPLMN), it is typically connected with a Visited Public Land Mobile Network (VPLMN) also referred to as a visited or serving network. Some or all of the mobility management functions 106 may reside in the VPLMN, in which case, functions in the VPLMN communicate with functions in the HPLMN as needed. However, in a non-roaming scenario, mobility management functions 106 and home subscriber functions 108 can reside in the same communication network. Furthermore, one or more of subscriber functions 108 can be part of a VPLMN if appropriate in certain circumstances. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
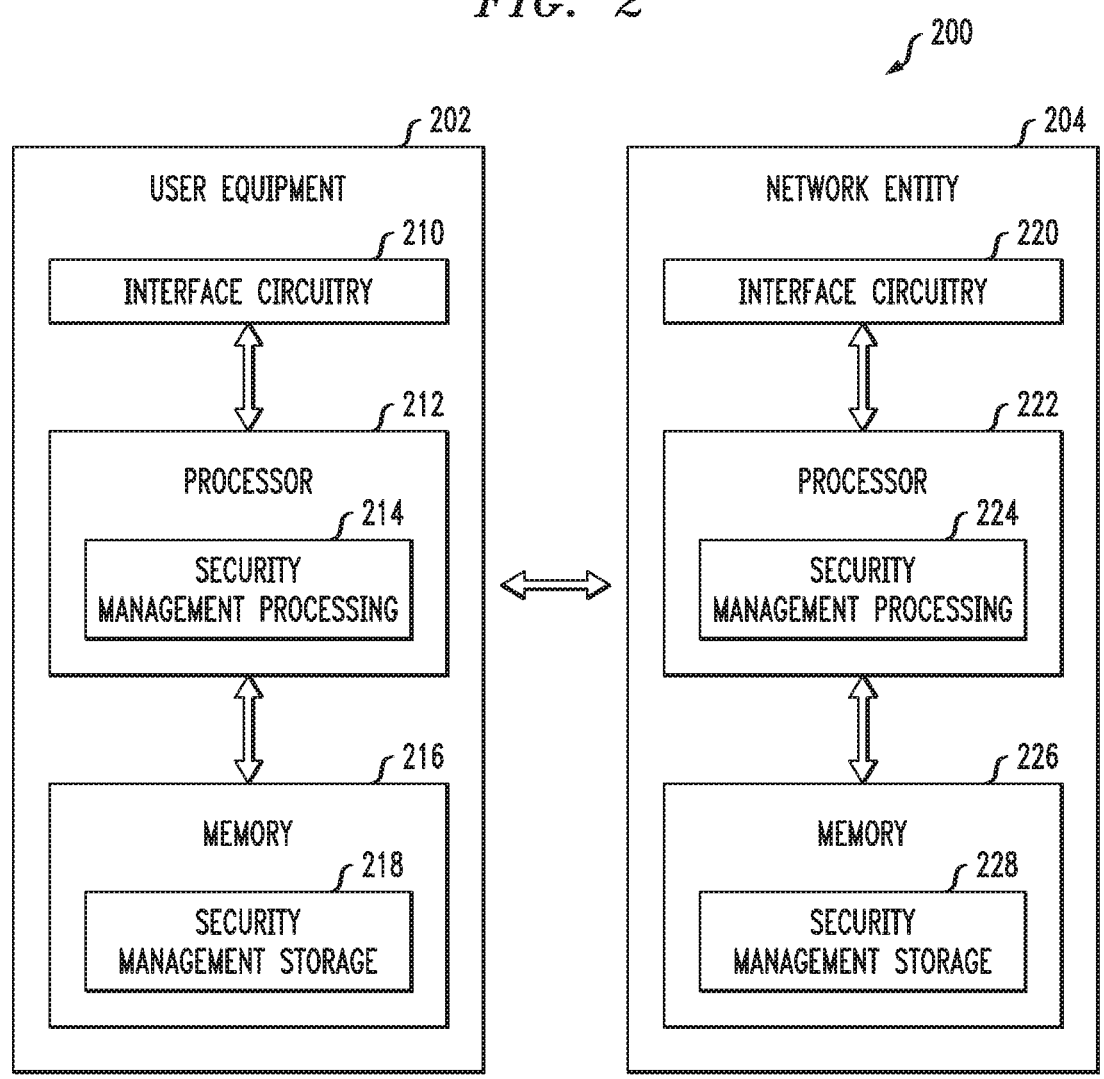
FIG. 2 illustrates user equipment and at least one network entity with which one or more illustrative embodiments may be implemented.

FIG. 2 is a block diagram of user equipment and a network entity for providing authentication in a communication system in an illustrative embodiment. System 200 is shown comprising user equipment 202 and a network entity 204.

It is to be appreciated that user equipment 202 represents one example of UE 102 described above in the context of FIG. 1. It is to be further appreciated that the network entity 204 represents any network entities (network functions, nodes, components, elements, services, etc.) that are configured to provide security management and other techniques described herein, for example, but not limited to, AMF, SEAF, UDM, ARPF, AUSF, NSSF, NEF, NRF, PCF and AF such as are part of an SBA-based 5G core network (which is part of an HPLMN, VPLMN, or both).

Network entity 204 can also be a network function, node, component, element, service, etc., external to the SBA-based 5G core network, i.e., a third-party external enterprise network. Further, network entity 204 can represent one or more processing devices configured to orchestrate and manage instantiation of one or more network functions (or other security management entities) within an SBA-based 5G core network or any communication network. Instantiation of a network function is described in the various 3GPP standards and otherwise well known to those of ordinary skill in the art.

User equipment 202 comprises a processor 212 coupled to a memory 216 and interface circuitry 210. The processor 212 of user equipment 202 includes a security management processing module 214 that may be implemented at least in part in the form of software executed by the processor. The processing module 214 performs operations associated with security management as described in conjunction with subsequent figures and otherwise herein. The memory 216 of user equipment 202 includes a security management storage module 218 that stores data generated or otherwise used during security management operations.

The network entity 204 comprises a processor 222 coupled to a memory 226 and interface circuitry 220. The processor 222 of the network entity 204 includes a security management processing module 224 that may be implemented at least in part in the form of software executed by the processor 222. The processing module 224 performs operations associated with security management as described in conjunction with subsequent figures and otherwise herein. The memory 226 of the network entity 204 includes a security management storage module 228 that stores data generated or otherwise used during security management operations.

The processors 212 and 222 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments. In addition, illustrative embodiments may be realized in a completely virtualized environment using software, running on a cloud platform, to emulate the various network functions.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 is configured for communication with network entity 204 and vice-versa via their respective interface circuitries 210 and 220. This communication involves user equipment 202 sending data to the network entity 204, and the network entity 204 sending data to the user equipment 202. However, in alternative embodiments, other network elements may be operatively coupled between user equipment 202 and network entity 204. The term "data" as used herein is intended to be construed broadly, so as to encompass any type of information that may be sent between user equipment and a network entity, as well as between network entities, including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network entity can be configured to incorporate additional or alternative components and to support other communication protocols.

Other system elements such as gNB 104 may each also be configured to include components such as a processor, memory and network interface. These elements need not be implemented on separate stand-alone processing platforms, but could instead, for example, represent different functional portions of a single common processing platform.

Still further, while FIG. 2 illustrates example architectures and interconnectivity between user equipment and a network entity, FIG. 2 can also represent example architectures and interconnectivity between multiple network entities (e.g., 202 can represent one network entity operatively coupled to another network entity in the form of network entity 204). More generally, FIG. 2 can be considered to represent two processing devices configured to provide respective security management functionalities and operatively coupled to one another in a communication system.

Figure 3:
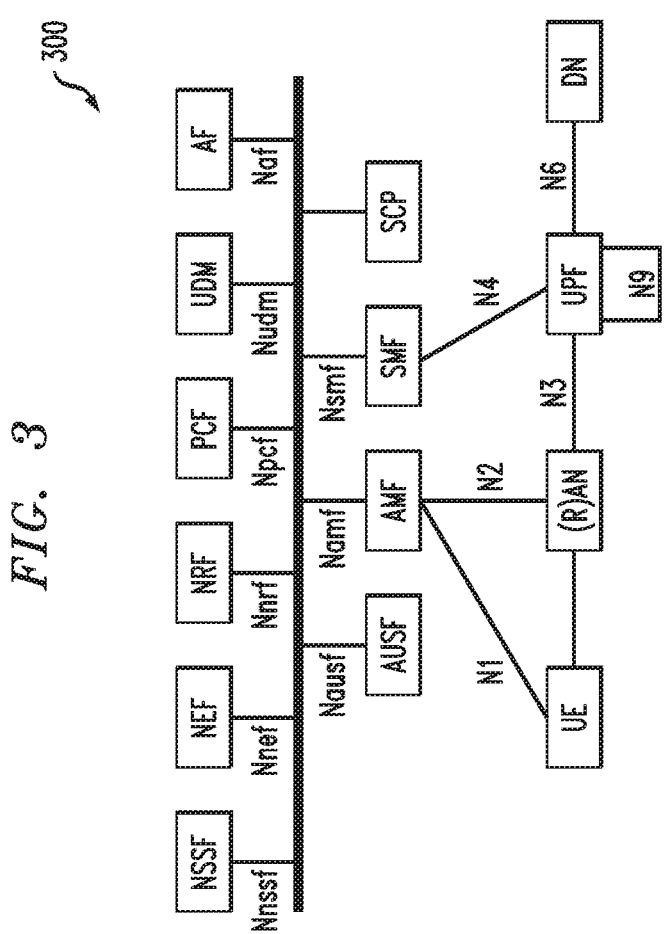
FIG. 3 illustrates a service-based architecture for a communication system within which one or more illustrative embodiments may be implemented.

The architecture for 5G systems is currently being standardized in 3GPP. As mentioned above, the 3GPP TS 23.501 defines the 5G system architecture as service-based, e.g., Service-Based Architecture (SBA). FIG. 3 illustrates a general 5G SBA implementation 300 as further described in 3GPP TS 23.501. Note that the network entities (elements/functions) in FIG. 3 are the same or similar to those described above in the context of FIGS. 1 and 2. The notation of a capital "N" in front of the network entity name (e.g., Nausf) denotes the SBA-based interface within the core network used to access the particular network entity (e.g., AUSF).

It is realized herein that in deploying different NFs, as depicted in FIG. 3, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces). By way of example only, AUSF may need to interact with an authentication, authorization, and accounting (AAA) server managed by a third-party enterprise ("third-party" here illustratively refers to a party other than the network operator of the SBA-based 5G core network). Using conventional 5G approaches, this results in AUSF supporting multiple services both internally and externally at the same time. Internally, AUSF may provide services to AMF, SMF, NEF, UDM, etc., while at the same time interacting with an external AAA server (e.g., an external NF configured for network slice authentication) which may be owned and operated by a third-party entity. More generally, in a 5G core network, each NF provides a defined set of services (acting as service producers) to other NFs (service consumers). Each NF can be a service producer for one service and service consumer for another service.

It is to be appreciated that a primary authentication procedure between a UE and the 5G core network is based on an Authentication and Key Agreement (AKA) challenge being sent from a home environment (HE or HPLMN) to the UE (e.g., as defined in the above-referenced TS 33.501). Note that the terms "home environment," "home network," and "home PLMN" may be used interchangeably herein. The AKA challenge contains a random number, RAND, and an authentication token, AUTN. AUTN comprises an authentication sequence number, SQN, which is maintained per user subscription in the HE and is incremented by HE for every authentication procedure. These values are passed in encrypted form and only the USIM can verify if the challenge is fresh or results in a synchronization failure.

When the UE receives a challenge that is not fresh (i.e., the reference SQN sent by the network is out of range), the UE responds on the challenge with a synchronization failure message that contains a value, AUTS (e.g., as described in the above-referenced TS 33.102).

AUTS (Authentication Token for Synchronization Failure) functions as a re-synchronization token that contains, in encrypted form, the value SQN that is maintained by the UE in the UICC, which can be interpreted as the lowest value the UE is willing to accept. Moreover, AUTS contains a message authentication code (MAC) that proves that AUTS was actually computed by the UE (which has a USIM containing the root key K) and has not been tampered.

When the network receives a valid AUTS from the UE, the network maps its own SQN value to the one received from the UE. This is how SQN re-synchronization happens when the sequence number maintained at the HE and the UE gets out of synchronization.

Problems with the above-described SQN-based AKA challenge procedure have been identified. For example, the freshness parameter for the calculation of AK (the keystream that protects the SQN returned to the network) during a re-synchronization in AKA is the random number RAND from the challenge. An attacker can force the re-use of RAND and hence the keystream AK may be used multiple times to protect different SQNs. The attacker could leverage the authentication failure feedback from the UE side and conduct an activity monitoring attack to break subscribers' privacy.

Further, the re-use of a keystream allows an attacker to obtain the Exclusive-OR (XOR) value between two different SQNs. It has been shown in a primary authentication procedure, how this property in conjunction with issuing fresh challenges can enable an attacker to estimate the least significant bits of the SQN. Hence, some information about the SQN can leak despite the encryption of SQN, which leads to a privacy leakage of the subscribers. It is realized that the protection of SQN during AKA re-synchronizations should prevent the information leakage of SQN values.

Illustrative embodiments overcome the above and other challenges by introducing a new SUPI type as 'SUPI plus $SQN_{MS}$', wherein $SQN_{MS}$ is included in SUCI generation, and wherein SUCI is computed as encrypted [SUPI concatenated with $SQN_{MS}$]. The UDM decrypts the received [SUPI concatenated with $SQN_{MS}$] to gain SUPI and $SQN_{MS}$. $SQN_{MS}$ is stored in UDM for use in a later step. Note that the subscript "MS" in $SQN_{MS}$ stands for Mobile Subscriber to distinguish this unique value computed by the UE from $SQN_{HE}$ which is the SQN computed and locally maintained by the HE. $SQN_{MS}$ may also be, more generally, referred to herein as an authentication sequence value.

At the UDM, authentication vector generation is kept the same as in the current scheme using the shared key (K) and the existing $SQN_{HE}$. In case of authentication failure at the UE due to SQN mismatch, since the current $SQN_{MS}$ has already been sent by the UE in an encrypted format and is already stored in the UDM, exchange of $SQN_{MS}$ is avoided which, as mentioned above, could otherwise be exploited by the attacker. The UDM uses the stored $SQN_{MS}$ for sequence number (SQN) re-synchronization.

In illustrative embodiments, the current usage of Elliptic Curve Integrated Encryption Scheme (ECIES) for concealment of SUPI can be expanded to accommodate $SQN_{MS}$ and SUPI. Since the maximum allowed size of a cipher text from concealment according to the ECIES protection scheme output is 3000 digits (e.g., see TS 33.501) and since SUPI utilizes only a few bytes of those maximum allowed digits, $SQN_{MS}$ can be accommodated by adapting the concealed part of SUPI. In the case where the SUPI type is an IMSI, then MSIN (9 to 10 digits) is the only value in plain text block considered for concealment using symmetric encryption in the UE (currently followed in 3GPP procedures). Thus, in illustrative embodiments, the above procedure is modified to include $SQN_{MS}$ (48 bits: 6 bytes) from the UE by concatenating (more generally, combining) $SQN_{MS}$ with the MSIN (9 to 10 digits) of the SUPI. This concatenated plain text block is encrypted at the UE and sent in a registration request to HE. At HE (i.e., at UDM/ARPF), de-concealment is performed to retrieve $SQN_{MS}$ and SUPI.

Figure 4:
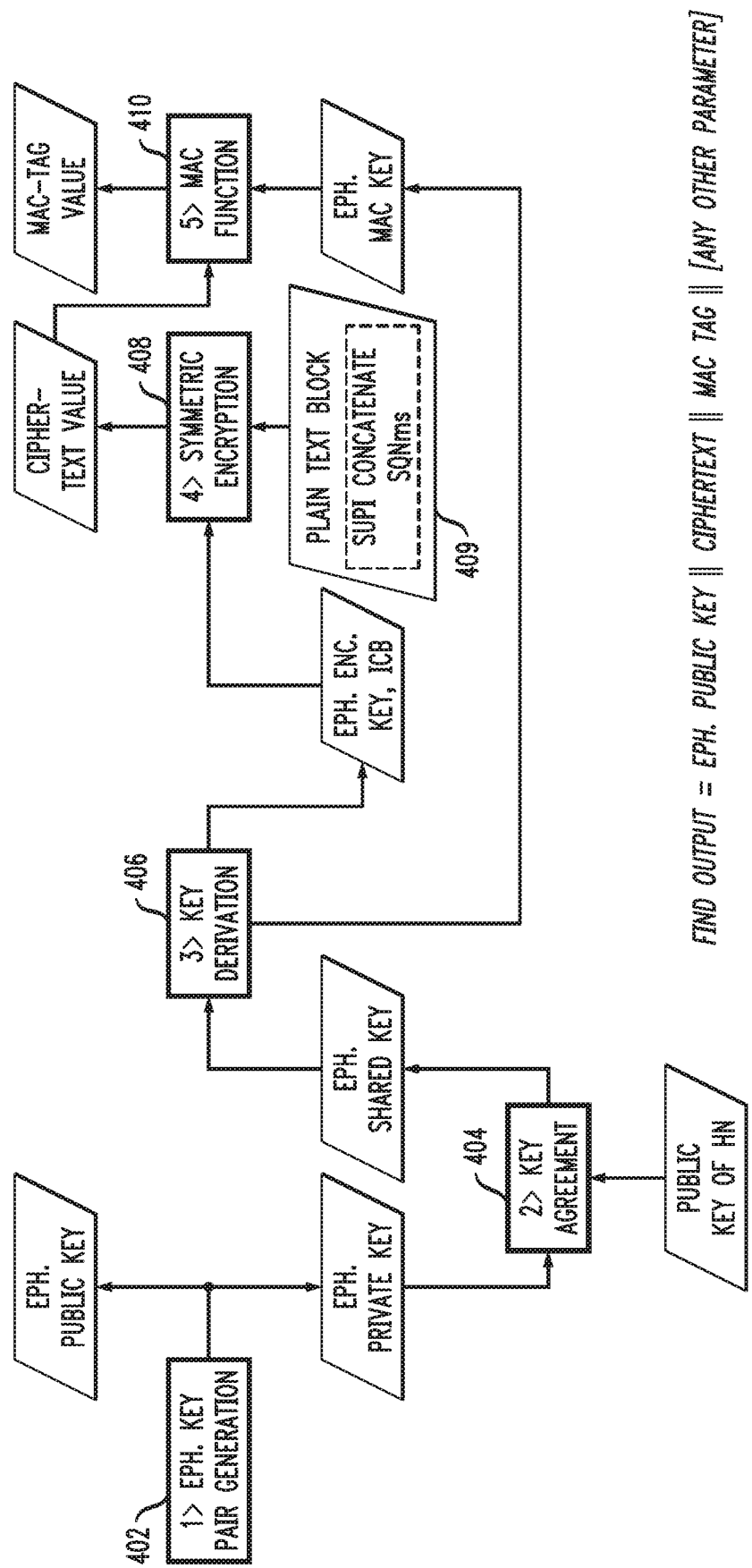
FIG. 4 illustrates an encryption scheme for user equipment, according to an illustrative embodiment.

FIG. 4 shows an encryption scheme 400 based on ECIES executed at the UE side. It is to be understood that the steps shown in the encryption scheme 400 are executed in a manner equivalent to how the current ECIES scheme is typically executed with the exception of the adaptation, in accordance with an illustrative embodiment, of concatenating the SUPI with $SQN_{MS}$ and taking the concatenated result as one plain text block for symmetric encryption. For example, in case of the SUPI type as an IMSI, then MSIN (9 to 10 digits) and $SQN_{MS}$ (48 bits: 6 bytes) are concatenated in the UE. More particularly, as shown, ephemeral key pair generation occurs in step 402. Key agreement is then performed in step 404, followed by key derivation in step 406. Symmetric encryption is performed in step 408 on the plain text block 409 which is the concatenation of SUPI and $SQN_{MS}$, as explained above. Lastly, MAC generation occurs in step 410.

Figure 5:
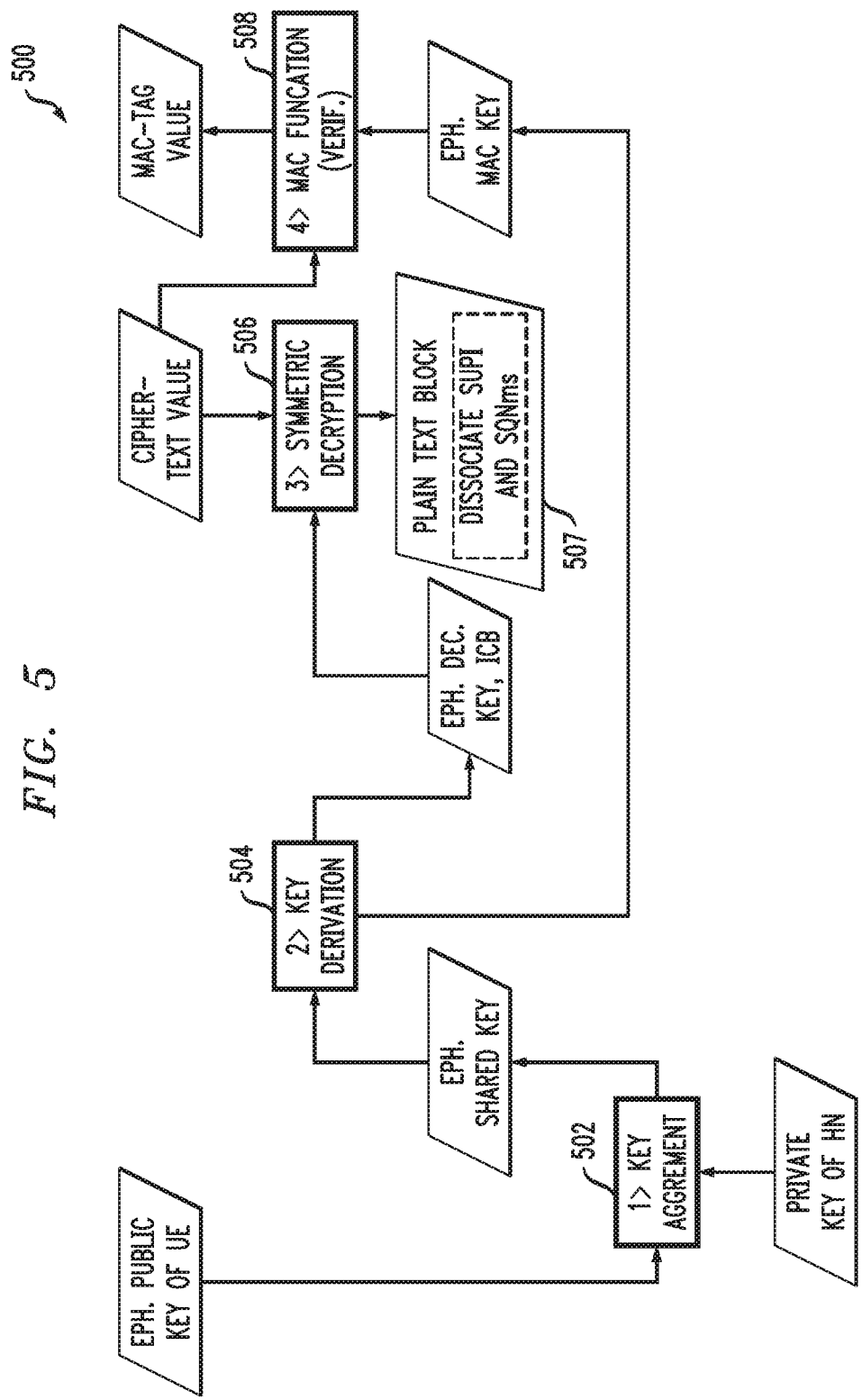
FIG. 5 illustrates a decryption scheme for user equipment, according to an illustrative embodiment.

FIG. 5 shows a decryption scheme 500 based on ECIES executed at the HE side. It is to be understood that the steps shown in the decryption scheme 500 are executed similar to how the current ECIES scheme is typically executed with the adaptation, in accordance with an illustrative embodiment, of dissociating SUPI and $SQN_{MS}$ after symmetric decryption of the encrypted block received from the UE (generated in FIG. 4). More particularly, as shown, key agreement occurs in step 502, followed by key derivation in step 504. Symmetric decryption is performed in step 506 on the cipher text block to obtain SUPI and $SQN_{MS}$ (block 507) in accordance with the illustrative embodiment and as explained above. Lastly, MAC verification occurs in step 508.

Figure 6:
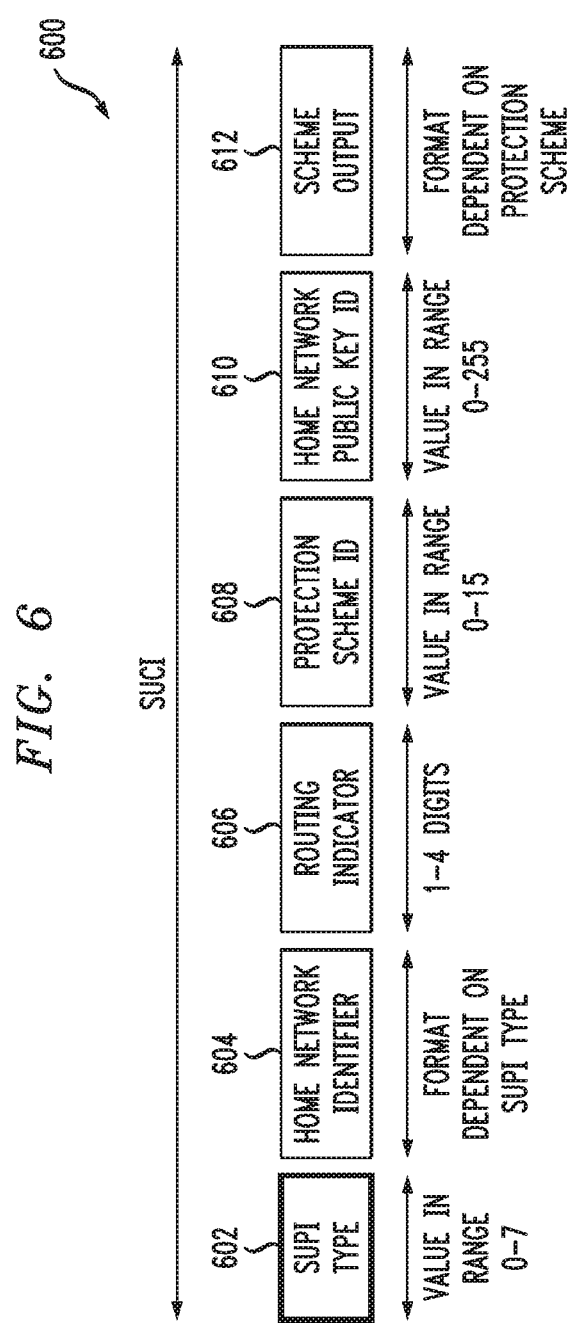
FIG. 6 illustrates a subscription concealed identifier, according to an illustrative embodiment.

FIG. 6 shows a data structure 600 of a SUCI that contains a SUPI type in field 602, which includes values in the range 0 to 7. The SUPI type field 602 identifies the type of the SUPI concealed in the SUCI. The encoding of SUCI for 'SUPI plus $SQN_{MS}$' is represented by a new SUPI type value, by way of example only, value 4 in the field 602. The other fields shown in SUCI structure 600 include home network (or HE) identifier field 604, routing indicator field 606, protection scheme identifier field 608, home network public key identifier field 610, and scheme output field 612, which are typical fields in a SUCI structure.

Figure 7:
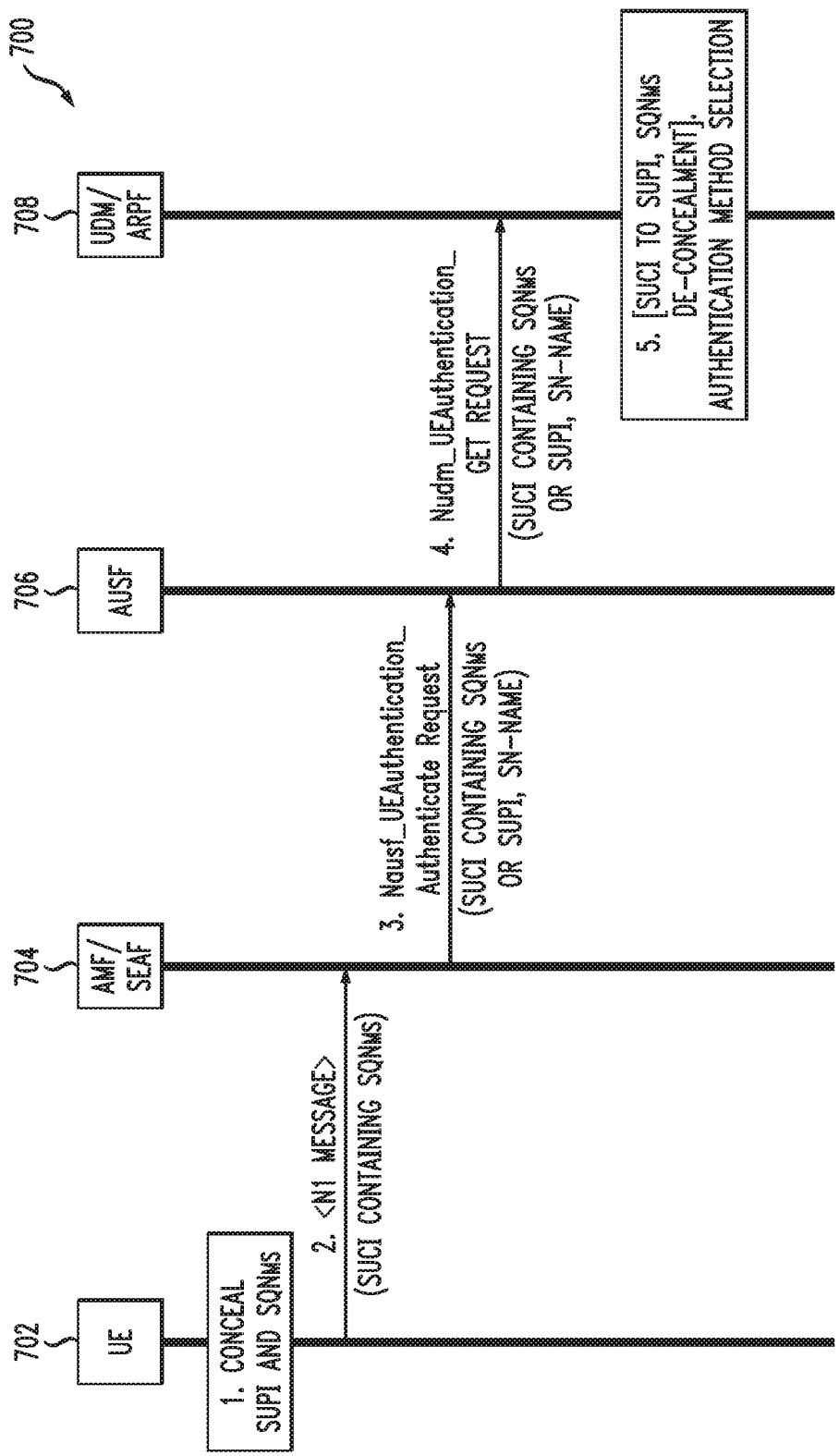
FIG. 7 illustrates a methodology for preventing sequence number leakage during user equipment authentication, according to an illustrative embodiment.

FIG. 7 illustrates a methodology 700 for preventing sequence number leakage during user equipment authentication, according to an illustrative embodiment. More particularly, FIG. 7 is an illustration of a UE and its HE (HPLMN) sharing $SQN_{MS}$ along with the SUCI, which as mentioned above prevents malicious actors from obtaining sequence number information. As illustratively depicted, methodology 700 comprises steps/operations executed by, and message/call flows between, a UE 702, an AMF/SEAF 704, an AUSF 706, and a UDM/ARPF 708.

In step 1, during a primary authentication procedure, the USIM of UE 702 concatenates SUPI and $SQN_{MS}$. The concatenated plain text block is encrypted using ECIES method, as described above in the context of FIG. 4. In accordance with illustrative embodiments, a new value is introduced for "SUPI Type," e.g., value 4 represents SUCI encoded with 'SUPI plus $SQN_{MS}$'.

In step 2, UE 702 uses SUCI (containing $SQN_{MS}$) in a registration request message sent to AMF/SEAF 704.

In step 3, AMF/SEAF 704 invokes the Nausf_UEAuthentication service by sending a Nausf_UEAuthentication_Authenticate Request message to AUSF 706 whenever AMF/SEAF 704 wishes to initiate an authentication. The Nausf_UEAuthentication_Authenticate Request message contains either:

(i) SUCI containing $SQN_{MS}$, as defined herein, or
(ii) SUPI, as defined in the above-referenced TS 23.501.

AMF/SEAF 704 includes the SUPI in the Nausf_UEAuthentication_Authenticate Request message in case AUSF 706 has a valid 5G-GUTI and re-authenticates UE 702. Otherwise, the SUCI containing $SQN_{MS}$ is included in Nausf_UEAuthentication_Authenticate Request. The Nausf_UEAuthentication_Authenticate Request may further contain the serving network name.

Upon receiving the Nausf_UEAuthentication_Authenticate Request message, AUSF 706 checks that the requesting AMF/SEAF 704 in the serving network is entitled to use the serving network name in the Nausf_UEAuthentication_Authenticate Request by comparing the serving network name with the expected serving network name. AUSF 706 stores the received serving network name temporarily. If the serving network is not authorized to use the serving network name, AUSF 706 responds with "serving network not authorized" in the Nausf_UEAuthentication_Authenticate Response (not expressly shown).

In step 4, assuming the serving network is authorized, AUSF 706 sends the Nudm_UEAuthentication_Get Request to UDM/ARPF 708. The Nudm_UEAuthentication_Get Request includes: SUCI containing $SQN_{MS}$ or SUPI; and the serving network name.

Upon reception of the Nudm_UEAuthentication_Get Request, UDM/ARPF 708 invokes a Subscription Identifier De-concealing Function (SIDF, not expressly shown) if a SUPI type is SUPI plus $SQN_{MS}$, (see, e.g., FIG. 5) and SIDF de-conceals SUCI to gain SUPI and $SQN_{MS}$ before UDM/ARPF 708 can process the request.

In step 5, based on SUPI, UDM/ARPF 708 chooses the authentication method. $SQN_{MS}$ is stored in UDM/ARPF 708 for future use. At UDM/ARPF 708, an authentication vector is generated with the existing $SQN_{HE}$.

Note that a Nudm_UEAuthentication_Get Response in reply to a Nudm_UEAuthentication_Get Request and a Nausf_UEAuthentication_Authenticate Response message in reply to a Nausf_UEAuthentication_Authenticate Request message may be generated in a typical manner. Note also that $SQN_{MS}$ is not considered for authentication vector generation in illustrative embodiments.

Figure 8:
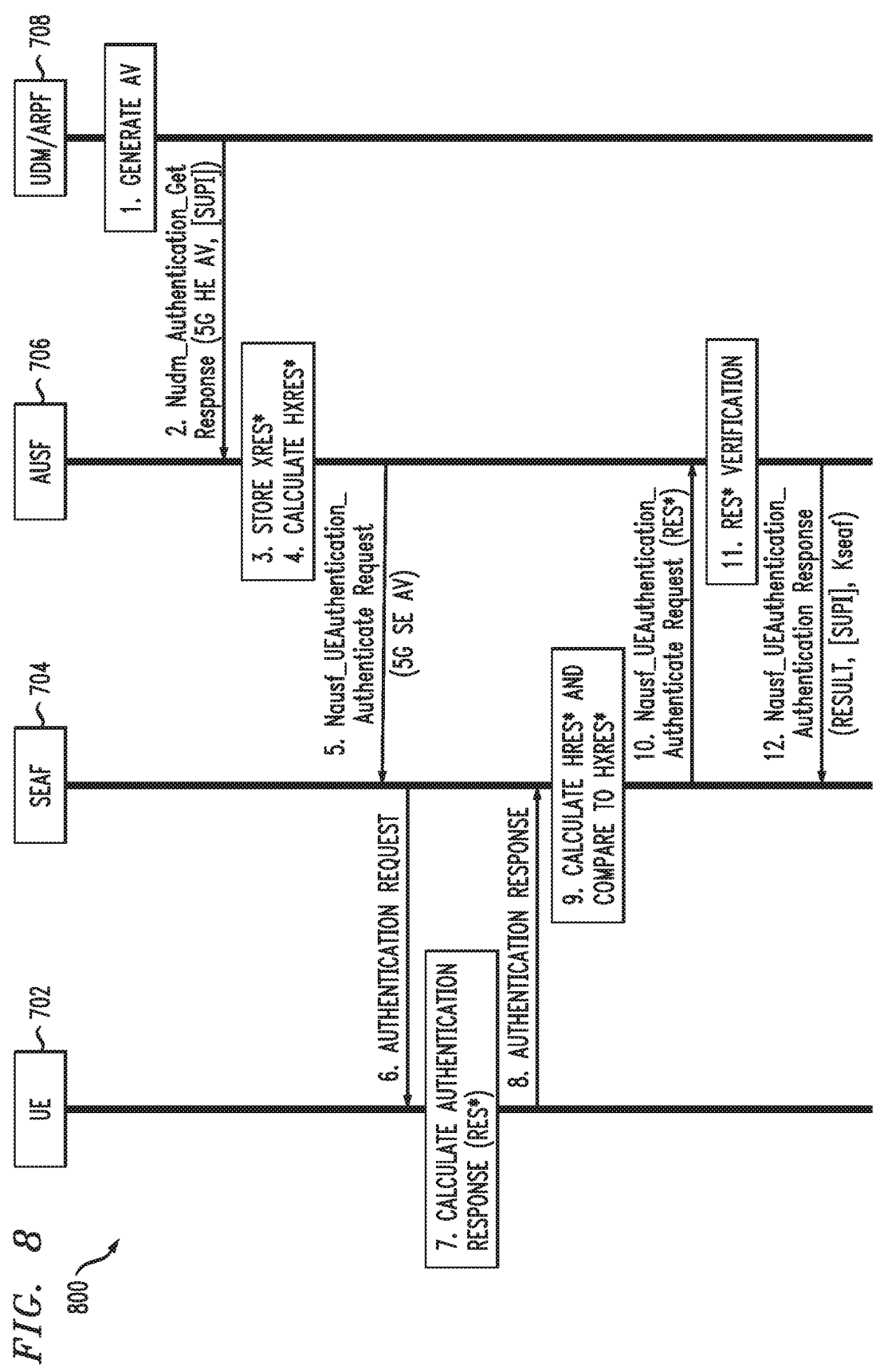
FIG. 8 illustrates a methodology for an authentication success case, according to an illustrative embodiment.
Figure 9:
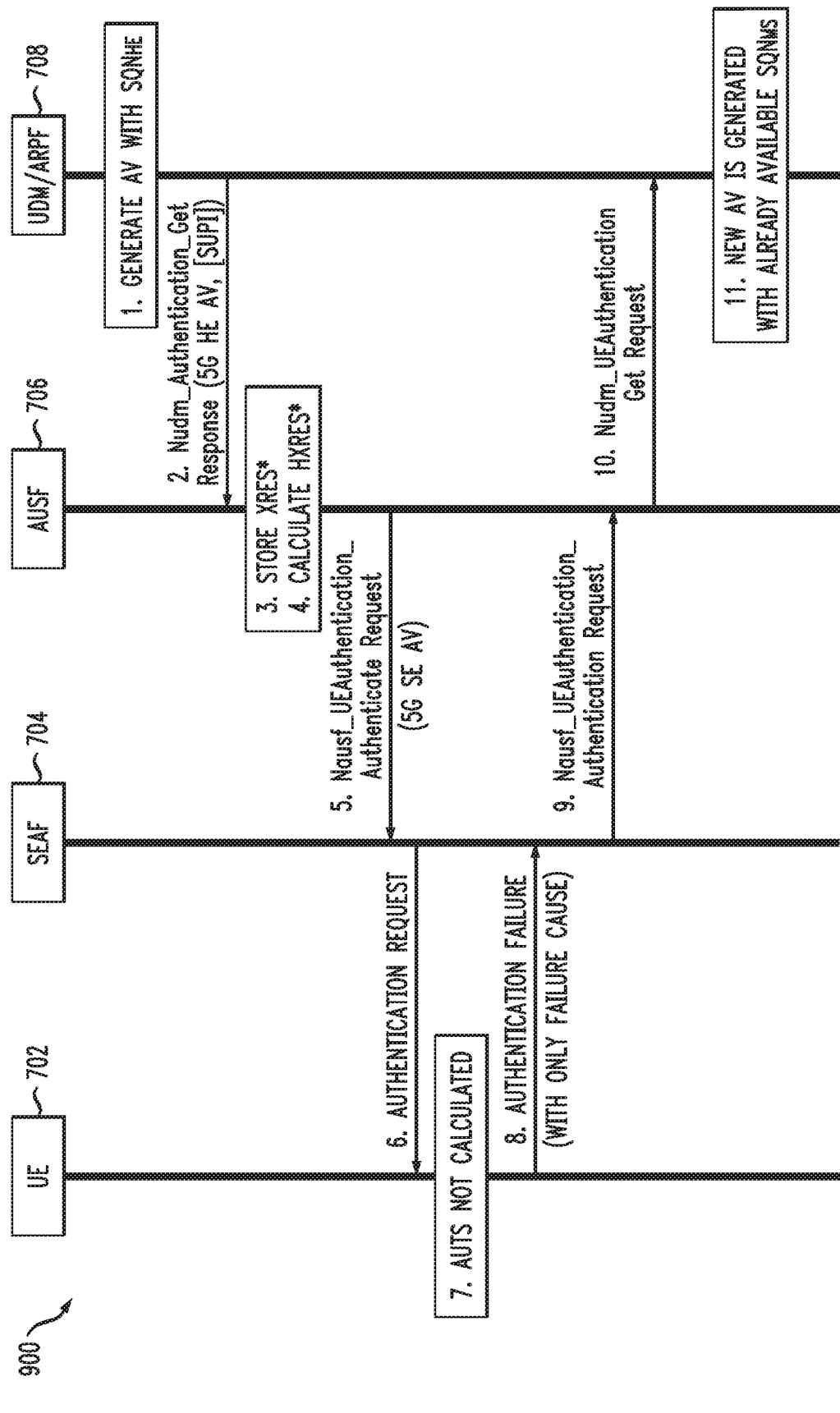
FIG. 9 illustrates a methodology for an authentication failure case, according to an illustrative embodiment.

Assuming the methodology 700 of FIG. 7 has occurred, FIGS. 8 and 9 illustrate an authentication success case and an authentication failure case, respectively.

FIG. 8 illustrates a methodology 800 for an authentication success case, according to an illustrative embodiment. More particularly, FIG. 8 shows the success case of a 5G AKA authentication procedure, which is the same as is described in the above-referenced TS.33.501. That is, there is no impact to the current call flow for a successful authentication procedure. As illustratively depicted, methodology 800 comprises steps/operations executed by, and message/call flows between, UE 702, SEAF 704 (AMF/SEAF), an AUSF 706, and a UDM/ARPF 708.

In step 1, UDM/ARPF 708 generates an Authentication Vector (AV).

In step 2, UDM/ARPF 708 sends Nudm_Authentication_Get Response (5G HE AV, [SUPI]) to AUSF 706.

In step 3, AUSF 706 stores XRES*.

In step 4, AUSF 706 calculates HXRES*.

In step 5, AUSF 706 sends Nausf_UEAuthentication_Authenticate Response (5G SE AV) to SEAF 704.

In step 6, SEAF 704 send Authentication Request to UE 702.

In step 7, UE 702 calculates Authentication Response (RES*).

In step 8, UE 702 sends Authentication Response to SEAF 704.

In step 9, SEAF 704 calculates HRES* and compares it to HXRES*.

In step 10, SEAF 704 sends Nausf_UEAuthentication_Authenticate Request (RES*) to AUSF 706.

In step 11, AUSF 706 verifies RES*.

In step 12, AUSF 706 sends Nausf_UEAuthentication_Authenticate Response (Result, [SUPI], Kseaf) to SEAF 704.

FIG. 9 illustrates a methodology 900 for an authentication failure case, according to an illustrative embodiment. More particularly, FIG. 9 shows the failure case of a 5G AKA authentication procedure, and how the previously stored $SQN_{MS}$ is advantageously already available. As illustratively depicted, methodology 900 comprises steps/operations executed by, and message/call flows between, UE 702, SEAF 704 (AMF/SEAF), AUSF 706, and UDM/ARPF 708.

In step 1, for each Nudm_Authenticate_Get Request, UDM/ARPF 708 creates a 5G HE Authentication Vector (AV). UDM/ARPF 708 does this by generating an AV with the Authentication Management Field (AMF) separation bit set to "1" as defined in the above-referenced TS 33.102. Note that details of authentication operations mentioned below can be found in corresponding annexes of the above-referenced TS 33.102. UDM/ARPF 708 then derives $K_{AUSF}$ and calculates XRES*. Finally, UDM/ARPF 708 creates a 5G HE AV from RAND, AUTN, XRES*, and $K_{AUSF}$.

In step 2, UDM/ARPF 708 then returns the 5G HE AV to AUSF 706 together with an indication that the 5G HE AV is to be used for 5G AKA in a Nudm_UEAuthentication_Get Response. In case SUCI was included in the Nudm_UEAuthentication_Get Request, UDM/ARPF 708 includes the SUPI in the Nudm_UEAuthentication_Get Response.

In step 3, AUSF 706 stores the XRES* temporarily together with the received SUCI or SUPI.

In step 4, AUSF 706 then generates the 5G AV from the 5G HE AV received from UDM/ARPF 708 by computing the HXRES* from XRES* and $K_{SEAF}$ from $K_{AUSF}$ (according to Annex A.6), and replacing the XRES* with the HXRES* and $K_{AUSF}$ with $K_{SEAF}$ in the 5G HE AV.

In step 5, AUSF 706 then removes the $K_{SEAF}$ and returns the 5G SE AV (RAND, AUTN, HXRES*) to SEAF 704 in a Nausf_UEAuthentication_Authenticate Response.

In step 6, SEAF 704 sends RAND, AUTN to UE 702 in a NAS message Authentication-Request. This message also includes the ngKSI that will be used by UE 702 and AMF 704 to identify the $K_{AMF}$ and the partial native security context that is created if the authentication is successful. This message also includes the ABBA parameter. The SEAF 704 sets the ABBA parameter.

In step 7, the ME in UE 702 forwards the RAND and AUTN received in a NAS message Authentication Request to the USIM in UE 702. Upon receipt of the RAND and AUTN, the USIM verifies the freshness of the 5G AV by checking whether AUTN can be accepted as described in the above-referenced TS 33.102. If the verification of the AUTN fails, then the USIM indicates to the ME the reason for failure.

In step 8, the ME responds with a NAS message Authentication Failure only with a CAUSE value indicating the reason for failure (as SQN failure/mismatch). AUTS is not calculated by the UE 702 and not shared to the network. UE 702 sends the Authentication Failure message to SEAF 704.

In step 9, upon receiving the Authentication Failure message from UE 702, SEAF 704 sends a Nausf_UEAuthentication_Authenticate Request message to AUSF 706.

In step 10, AUSF 706 sends a Nudm_UEAuthentication_Get Request message to UDM/ARPF 708.

In step 11, when UDM/ARPF 708 receives a Nudm_UEAuthentication_Get Request message, it functions as described in the above-referenced TS 33.102 where ARPF is mapped to HE/AuC (Authentication Center). UDM/ARPF 708 sends a Nudm_UEAuthentication_Get Response message with a new authentication vector (AV) by considering the $SQN_{MS}$ from the database (i.e., $SQN_{MS}$ received in Nudm_UEAuthentication_Get Request). AUSF 706 then performs a new authentication procedure with UE 702 according to the above-referenced TS 33.501 depending on the authentication method applicable for UE 702.

Accordingly, in accordance with illustrative embodiments, on the USIM, during the ECIES procedure of primary authentication, a new SUPI type is added, and $SQN_{MS}$ is concatenated with SUPI (plain text block). At the UDM, when the SUPI indicates 'SUPI plus $SQN_{MS}$', the de-concealment operation disassociates SUPI and $SQN_{MS}$. UDM stores $SQN_{MS}$ temporarily until the success or failure of the authentication is known. There is no change to any entities if the authentication succeeds. If there is an authentication failure at the UE, the UE sends only an authentication failure message to the HE with an SQN failure cause code (the cause code may be the existing value or a new value), without AUTS. At the UDM, if an authentication failure message with cause code (SQN failure) is received, the stored value of $SQN_{MS}$ received at the initial step is processed. The UDM synchronizes its value of SQN, i.e., $SQN_{HE}=SQN_{MS}$. A new cause code value in the authentication failure message for the UE can indicate to the UDM that $SQN_{MS}$ has already been sent to the UDM and UDM should use the stored $SQN_{MS}$. If the existing cause code value is used, then the UDM state machine has to remember the early receipt of $SQN_{MS}$ and use that value while processing the authentication failure message from the UE. Sequence number management profiles and synchronization procedures detailed in the above-reference TR 33.102 are kept intact and not altered.

Advantageously, illustrative embodiments provide solutions, as described herein, that prevent SQN leakage by an attacker with minimal changes to the UE and UDM. The solutions do not affect any entity between the USIM and home network. The solutions can work as an additional authentication option for 5G AKA protocol, along with the current options. No additional security functions or protocols are introduced. In case of authentication failure, the UE need not perform AUTS computation, which saves compute cycles and power.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;
   at least one memory including computer program code;
   the at least one memory and the computer program code being configured to, with the at least one processor, cause the apparatus at least to:
   obtain a permanent identifier and an authentication sequence value that are unique to the apparatus;
   conceal the permanent identifier and the authentication sequence value; and
   send the concealed permanent identifier and the authentication sequence value in a registration message to a communication network.

2. The apparatus of claim 1, wherein the at least one memory and the computer program code being configured to, with the at least one processor, further cause the apparatus to:
   combine the permanent identifier and the authentication sequence value prior to concealment.

3. The apparatus of claim 1, wherein the at least one memory and the computer program code being configured to, with the at least one processor, further cause the apparatus to:
   in response to receipt of an authentication request message from the communication network, send a response message to the communication network containing a failure cause indication without a re-synchronization token.

4. The apparatus of claim 1, wherein the at least one memory and the computer program code being configured to, with the at least one processor, further cause the apparatus to:
   in response to receipt of an authentication request message from the communication network, send a response message to the communication network containing a failure cause indication without a re-synchronization token, wherein the failure cause indication indicates that the authentication sequence value had been sent earlier.

5. The apparatus of claim 1, wherein the apparatus is part of user equipment configured for 5G authentication operations and the communication network is part of a 5G core network.

6. The apparatus of claim 5, wherein the permanent identifier comprises a subscriber permanent identifier (SUPI) and the authentication sequence value comprises a sequence number (SQN) that are concatenated and encrypted as part of a subscriber concealed identifier (SUCI) and sent in the registration message.

7. The apparatus of claim 1, wherein concealing the permanent identifier and the authentication sequence value comprises utilizing a combination of the permanent identifier and the authentication sequence value as an input to an encryption algorithm.

8. The apparatus of claim 7, wherein the encryption algorithm comprises an elliptic curve integrated encryption scheme.

9. The apparatus of claim 7, wherein the combination of the permanent identifier and the authentication sequence value comprises a concatenation of the permanent identifier and the authentication sequence value.

10. An apparatus comprising:
at least one processor;
at least one memory including computer program code;
the at least one memory and the computer program code being configured to, with the at least one processor, cause the apparatus at least to:
obtain a permanent identifier and an authentication sequence value that are unique to the apparatus;
conceal the permanent identifier and the authentication sequence value;
send the concealed permanent identifier and the authentication sequence value in a registration message to a communication network; and
combine the permanent identifier and the authentication sequence value prior to concealment;
wherein combining the permanent identifier and the authentication sequence value prior to concealment further comprises concatenating the permanent identifier and the authentication sequence value to generate a single plain text block that is concealed and sent in the registration message.

11. A method comprising:
obtaining a permanent identifier and an authentication sequence value that are unique to user equipment;
concealing the permanent identifier and the authentication sequence value; and
sending the concealed permanent identifier and the authentication sequence value in a registration message from the user equipment to a communication network.

12. The method of claim 11, further comprising combining the permanent identifier and the authentication sequence value prior to concealment.

13. The method of claim 11, further comprising, in response to receipt of an authentication request message from the communication network, sending a response message to the communication network containing a failure cause indication without a re-synchronization token.

14. The method of claim 11, further comprising, in response to receipt of an authentication request message from the communication network, sending a response message to the communication network containing a failure cause indication without a re-synchronization token, wherein the failure cause indication indicates that the authentication sequence value had been sent earlier.

15. The method of claim 11, wherein the user equipment is configured for 5G authentication operations and the communication network is part of a 5G core network.

16. The method of claim 15, wherein the permanent identifier comprises a subscriber permanent identifier (SUPI) and the authentication sequence value comprises a sequence number (SQN) that are concatenated and encrypted as part of a subscriber concealed identifier (SUCI) and sent in the registration message.

17. The method of claim 11, wherein concealing the permanent identifier and the authentication sequence value comprises utilizing a combination of the permanent identifier and the authentication sequence value as an input to an encryption algorithm.

18. The method of claim 17, wherein the encryption algorithm comprises an elliptic curve integrated encryption scheme.

19. The method of claim 17, wherein the combination of the permanent identifier and the authentication sequence value comprises a concatenation of the permanent identifier and the authentication sequence value.

20. A method comprising:
obtaining a permanent identifier and an authentication sequence value that are unique to user equipment;
concealing the permanent identifier and the authentication sequence value;
sending the concealed permanent identifier and the authentication sequence value in a registration message from the user equipment to a communication network; and
combining the permanent identifier and the authentication sequence value prior to concealment;
wherein combining the permanent identifier and the authentication sequence value prior to concealment further comprises concatenating the permanent identifier and the authentication sequence value to generate a single plain text block that is concealed and sent in the registration message.

21. An article of manufacture comprising a non-transitory computer-readable storage medium having embodied therein executable program code that when executed by a processor causes the processor to perform the steps of:
obtaining a permanent identifier and an authentication sequence value that are unique to user equipment;
concealing the permanent identifier and the authentication sequence value; and
sending the concealed permanent identifier and the authentication sequence value in a registration message from the user equipment to a communication network.

22. The article of claim 21, further comprising the step of combining the permanent identifier and the authentication sequence value prior to concealment.

23. The article of claim 21, further comprising the step of, in response to receipt of an authentication request message from the communication network, sending a response message to the communication network containing a failure cause indication without a re-synchronization token.

24. The article of claim 21, further comprising the step of, in response to receipt of an authentication request message from the communication network, sending a response message to the communication network containing a failure cause indication without a re-synchronization token, wherein the failure cause indication indicates that the authentication sequence value had been sent earlier.

25. The article of claim 21, wherein concealing the permanent identifier and the authentication sequence value comprises utilizing a combination of the permanent identifier and the authentication sequence value as an input to an encryption algorithm.

26. The article of claim 21, wherein the encryption algorithm comprises an elliptic curve integrated encryption scheme.

27. The article of claim 21, wherein the combination of the permanent identifier and the authentication sequence value comprises a concatenation of the permanent identifier and the authentication sequence value.

28. An article of manufacture comprising a non-transitory computer-readable storage medium having embodied therein executable program code that when executed by a processor causes the processor to perform the steps of:
- obtaining a permanent identifier and an authentication sequence value that are unique to user equipment;
- concealing the permanent identifier and the authentication sequence value;
- sending the concealed permanent identifier and the authentication sequence value in a registration message from the user equipment to a communication network; and
- combining the permanent identifier and the authentication sequence value prior to concealment;
- wherein combining the permanent identifier and the authentication sequence value prior to concealment further comprises concatenating the permanent identifier and the authentication sequence value to generate a single plain text block that is concealed and sent in the registration message.

* * * * *